(12) United States Patent
Sabripour et al.

(10) Patent No.: US 10,866,950 B2
(45) Date of Patent: Dec. 15, 2020

(54) METHOD AND SYSTEM FOR MODIFYING A SEARCH REQUEST CORRESPONDING TO A PERSON, OBJECT, OR ENTITY (POE) OF INTEREST

(71) Applicant: MOTOROLA SOLUTIONS, INC, Chicago, IL (US)

(72) Inventors: Shervin Sabripour, Plantation, FL (US); Alejandro G. Blanco, Fort Lauderdale, FL (US); Patrick D. Koskan, Jupiter, FL (US); Scott M. Alazraki, Davie, FL (US); Eduardo Schneid, Ramat Gan (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 515 days.

(21) Appl. No.: 15/833,058

(22) Filed: Dec. 6, 2017

(65) Prior Publication Data

US 2019/0171740 A1    Jun. 6, 2019

(51) Int. Cl.

| | |
|---|---|
| *G06F 16/20* | (2019.01) |
| *G06F 16/242* | (2019.01) |
| *G08B 27/00* | (2006.01) |
| *G10L 15/22* | (2006.01) |
| *G10L 15/08* | (2006.01) |
| *G06Q 50/26* | (2012.01) |
| *G06F 16/27* | (2019.01) |

(Continued)

(52) U.S. Cl.
CPC ...... *G06F 16/2425* (2019.01); *G06F 16/2428* (2019.01); *G06F 16/24534* (2019.01); *G06F 16/27* (2019.01); *G06Q 50/265* (2013.01); *G08B 27/001* (2013.01); *G10L 15/08* (2013.01); *G10L 15/22* (2013.01); *G10L 15/00* (2013.01); *G10L 2015/088* (2013.01)

(58) Field of Classification Search
None
See application file for complete search history.

(56) References Cited

U.S. PATENT DOCUMENTS

| | | |
|---|---|---|
| 6,559,769 B2 | 5/2003 | Anthony et al. |
| 6,850,934 B2 * | 2/2005 | Bates ................. G06F 16/9537 |
| 8,938,519 B1 | 1/2015 | Shreesha et al. |

(Continued)

FOREIGN PATENT DOCUMENTS

WO    20090322630 A1    3/2009

*Primary Examiner* — Belix M Ortiz Ditren
(74) *Attorney, Agent, or Firm* — Daniel R. Bestor

(57) ABSTRACT

A system and method for modifying a search request corresponding to a person, object, or entity (POE) of interest. The system includes a POE search controller that detects a POE search request, extracts POE of interest metadata including one or more features associated with the POE of interest, generates a POE detection classifier based on the one or more features, identifies types of data capturing devices that are capable of capturing data for detection of the POE of interest, determines data capturing settings based on the POE of interest metadata and respective device type associated with data capturing devices, generates a modified POE search request including the POE detection classifier and respective data capturing settings for each of the one or more types of data capturing devices, and transmits the modified POE search request to one or more communication devices.

20 Claims, 6 Drawing Sheets

(51) Int. Cl.
   *G06F 16/2453*   (2019.01)
   *G10L 15/00*     (2013.01)

(56) References Cited

U.S. PATENT DOCUMENTS

| | | |
|---|---|---|
| 9,161,154 B2 | 10/2015 | Ibasco et al. |
| 9,386,050 B2 | 7/2016 | Oswald |
| 9,641,965 B1 | 5/2017 | Rapp et al. |
| 9,679,032 B2 | 6/2017 | Uenoyama et al. |
| 2003/0172357 A1* | 9/2003 | Kao ............ G06F 16/353 715/256 |
| 2009/0061833 A1 | 3/2009 | Ho et al. |
| 2010/0227631 A1 | 9/2010 | Bolton et al. |
| 2012/0115494 A1 | 5/2012 | Christensen et al. |
| 2016/0065658 A1 | 3/2016 | Alon et al. |
| 2016/0344581 A9 | 11/2016 | Karmarkar |

\* cited by examiner

METHOD AND SYSTEM FOR MODIFYING A SEARCH REQUEST CORRESPONDING TO A PERSON, OBJECT, OR ENTITY (POE) OF INTEREST

BACKGROUND OF THE INVENTION

Public safety personnel are often tasked with locating missing persons, suspects, stolen vehicle, and the like. Dispatchers send notifications including information about the persons or objects to be located to public safety personnel who may be patrolling in a given area. However, in some cases, it may not be feasible for public safety personnel to visually identify and locate the persons or objects in crowded or large geographic areas.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
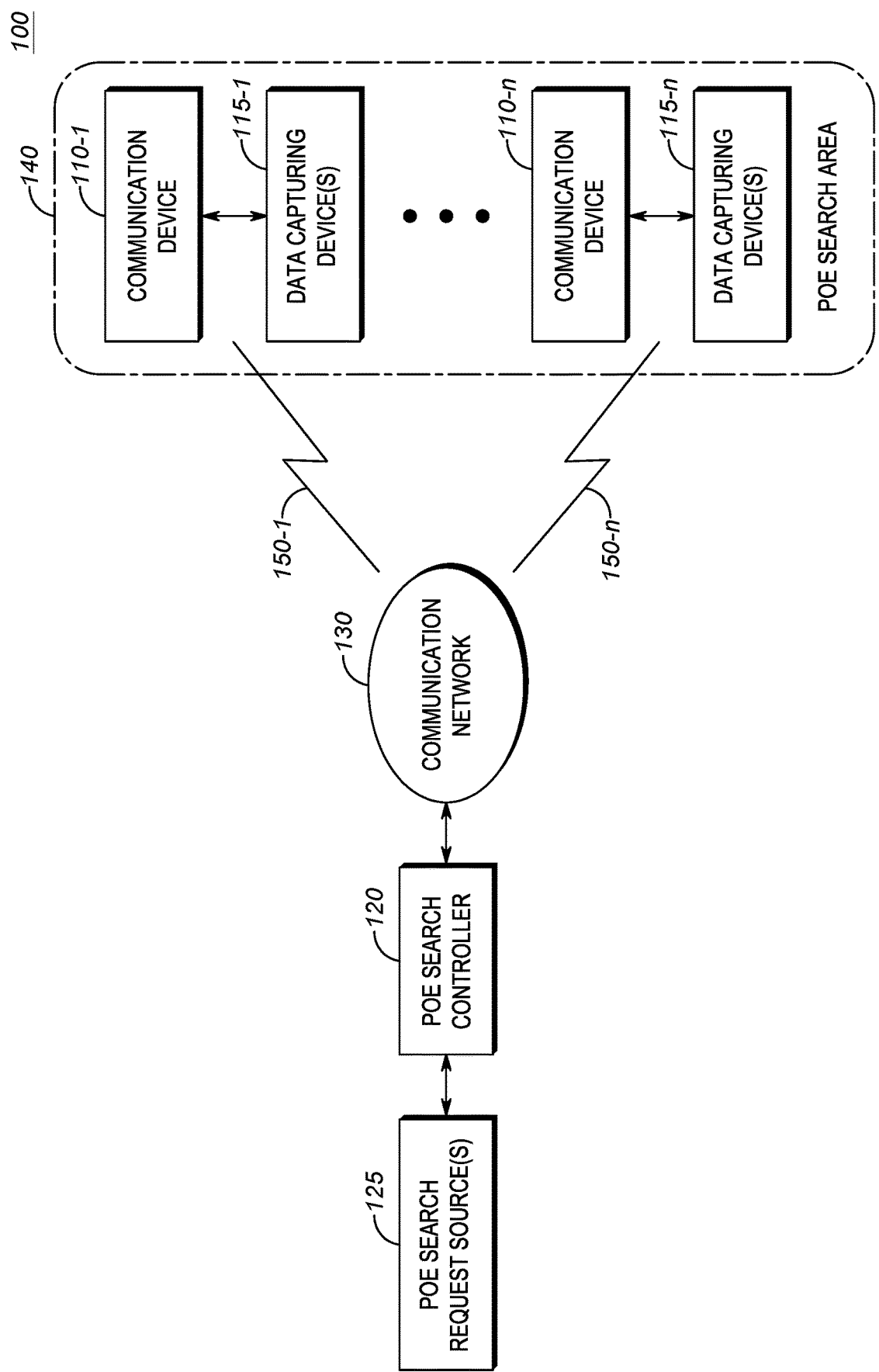
FIG. 1 is a system diagram illustrating a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel often receive notifications in the form of 'all points bulletins' (APBs) or 'be on the look outs' (BOLOs) to locate a person, object, or entity (POE) of interest. Such notifications may be provided to public safety personnel at pre-shift check-in time, for example, in paper form or communicated verbally by another person. Sometimes, these notifications are provided in real time (when an incident is in progress) to public safety personnel (for example, over the air via a group call to their portable radios or in electronic forms) with a request to find a missing child or locate a suspect or a car witnessed in a drive-by. Such APB or BOLO notifications include specific information (e.g., shirt color, facial features, license plate number of the car, etc.) about the POE of interest to be located that will help the personnel to visually identify and locate the POE of interest. However, public safety personnel may need to remember this information or often check these details stored in their devices as they attempt to locate the POE of interest, for example, while patrolling an area or performing their day-to-day functions. Further public safety personnel may be limited by knowledge to locate only POEs of interest that are identified in the notifications provided to them.

Public safety personnel carry or wear computing devices and sensors (e.g., body-worn camera) or operate vehicle dash cameras and sensors that are capable of capturing data related to different POEs and classify/detect POEs in a given area without human intervention. However, public safety personnel may need to review the details of the POE provided in such APB or BOLO notifications and further manually configure computing devices and sensors available with them in order to capture data in their proximity and detect POEs of interest. For example, public safety personnel receiving a request to locate a POE may manually need to configure the camera to capture images at a particular resolution or a microphone to capture sound originating from a particular direction. Otherwise, the default or current configurations at the camera, microphone or other connected sensors may not be sufficient or suitably adapted to capture particular features of a POE. If the data is not captured using proper configuration, it may not be possible to classify and detect the POE using the captured data. This in turn may lead to not detecting the POE even though the POE was present at the given area and data was captured corresponding to the POE. Further, such review of notifications and manual configuration of computing devices and sensors by the public safety personnel increases the workload of public safety personnel and may also further distract the personnel from performing mission critical public safety functions.

Disclosed below is an improved system and method that provides a solution to the concerns identified in the above paragraphs. The improved system and method employs computing devices that automatically monitors for POE search requests (i.e., APBs and BOLOs) originating from different sources and further sends a modified POE search request to edge communication devices, where the modified search request includes POE detection classifier and data capturing settings that are automatically generated for the edge communication devices based on the POE of interest metadata extracted from the POE search requests. The edge communication devices in turn activates the POE detection process by configuring the data capturing settings at the data capturing devices in order to capture data and further process the captured data using the POE detection classifier to detect the POE of interest.

One embodiment provides a method for operating a search controller to modify a search request corresponding to a person, object, or entity (POE) of interest. The method comprises detecting a POE search request indicating a request to search the POE of interest; extracting, from the POE search request, POE of interest metadata including one or more features associated with the POE of interest; generating a POE detection classifier based on the one or more features associated with the POE of interest; identifying one or more types of data capturing devices that are capable of capturing data for detection of the POE of interest; determining, for each of the one or more types of data capturing devices, respective data capturing settings based on the POE of interest metadata and respective device type associated with the data capturing devices; generating a modified POE search request indicating a request to search POE of interest, the modified POE search request including the POE detection classifier and respective data capturing settings for each of the one or more types of data capturing devices; and transmitting the modified POE search request to one or more communication devices.

Another embodiment provides a controller that includes a transceiver and an electronic processor communicatively coupled to the transceiver. The electronic processor is configured to detect a person, object, or entity (POE) search request indicating a request to search a POE of interest, extract, from the POE search request, POE of interest metadata including one or more features associated with the POE of interest; generate a POE detection classifier based on the one or more features associated with the POE of interest, identify one or more types of data capturing devices that are capable of capturing data for detection of the POE of interest, determine, for each of the one or more types of data capturing devices, respective data capturing settings based on the POE of interest metadata and respective device type associated with data capturing devices, generate a modified POE search request indicating a request to search the POE of interest, the modified POE search request including the POE detection classifier and respective data capturing settings for each of the one or more types of data capturing devices, and transmit, via the transceiver, the modified POE search request to one or more communication devices.

Another embodiment provides a communication system that includes one or more person, object, or entity (POE) search request sources, a communication device, a communication network, and a POE search controller communicating with the one or more POE search request sources and the communication device via the communication network. The POE search controller is configured to detect a POE search request originating from the one or more POE search request sources, the POE search request indicating a request to search a POE of interest, extract, from the POE search request, POE of interest metadata including one or more features associated with the POE of interest, generate a POE detection classifier based on the one or more features associated with the POE of interest, identify one or more types of data capturing devices that are capable of capturing data for detection of the POE of interest, determine, for each of the one or more types of data capturing devices, respective data capturing settings based on the POE of interest metadata and respective device type associated with data capturing devices, generate a modified POE search request indicating a request to search the POE of interest, the modified POE search request including the POE detection classifier and respective data capturing settings for each of the one or more types of data capturing devices, and transmit the modified POE search request to the communication device.

Each of the above-mentioned embodiments will be discussed in more detail below, starting with example communication system and device architectures of the system in which the embodiments may be practiced, followed by an illustration of processing steps for achieving the method, device, and system for modifying a POE search request.

Further advantages and features consistent with this disclosure will be set forth in the following detailed description, with reference to the figures.

Referring now to the drawings, and in particular FIG. 1, an example communication system 100 is shown including a plurality of communication devices 110-1 through 110-$n$, a person, object, or entity (POE) search controller 120, and one or more POE search request sources 125. The plurality of communication devices 110-1 through 110-$n$ can be interchangeably referred to, collectively, as communication devices 110, and generically as a communication device 110. The communication devices 110-1 through 110-$n$ may be operated by respective users (for example, a public safety personnel), who may carry or wear the respective communication devices 110. The communication devices 110 include, but not limited to, a battery-powered portable radio used for narrowband and/or broadband direct-mode or infrastructure communications, a battery-powered radio speaker microphone (RSM) video capture device, a laptop having an integrated video camera and used for data applications such as incident support applications, smart glasses which may be virtual reality, augmented reality, or mixed reality glasses, wearable communication devices, mobile phones, drones, robots, and vehicular radios. Each communication device 110 may include one or more wireless communication interfaces for communicating with each other and other devices or networks in the communication system 100.

The POE search controller 120 is an electronic computing device or server that is configured to communicate with communication devices 110 via a communication network 130. Wireless air-interface links 150-1 through 150-$n$ communicatively couple the respective communication devices 110-1 through 110-$n$ to the POE search controller 120 and other network devices (not shown), via the communication network 130. The communication network 130 may include a wired or wireless network, or a combination of wired and wireless networks, operated for example, by a cellular service provider, or any public safety network operated by a government or private organization. In one embodiment, the communication networks 130 may include one or more of land mobile radio (LMR) networks, such as implemented in accordance with Association of Public Safety Communication officials (APCO) Project 25 (P25) networks and long term evolution (LTE) networks. The communication networks 130, for example, may include network components such as base stations (not shown) that can receive information (data, voice, video, etc) in a signal from the POE search controller 120 and communication devices 110. The base stations can also transmit information in signals to the POE search controller 120 and communication devices 110.

In accordance with embodiments of the disclosure, the POE search controller 120 monitors, collects, logs, or records POE search requests originating from different POE search request sources 125. POE search request sources 125 include databases and other data servers in the communication system 100 that are responsible for generating, storing, publishing, or transmitting electronic versions of POE search requests to initiate a search for POE of interest. The POE of interest refers to any distinguishable being or inanimate object or entity, for which a search has been requested via the POE search request. The POE of interest may be a missing person or a suspect, a stolen object (e.g., vehicle, jewelry), weapons, or combination thereof. POE search request sources 125 may include a public safety dispatch system, record management system (RMS), social media networks, AMBER (America's Missing: Broadcast Emergency Response) alert system, National Incident Management System (NIMS), Roll Call system, and various other databases operated by public safety agencies. The POE search request may include, for example, notifications such as APB or BOLOs or other alerts that are transmitted by a dispatcher to portable radios of public safety personnel via a computer aided dispatch (CAD) device associated with the dispatcher. For example, the POE search controller 120 automatically monitors notifications transmitted by the CAD device to the portable radios of public safety personnel and extracts POE search request when it detects an APB or BOLO notification. In other embodiments, the POE search controller 120 may also employ speech recognition engine to monitor oral notifications provided to public safety responders with respect to detecting POE search requests. In one embodiment, the POE search request source 125 may be a communication device or radio associated the public safety responder. For example, the public safety responder may input search criteria (e.g., "I am looking for a person in blue shirt") through a voice or text query or via a talk group channel, which may be monitored by POE search controller 120 to detect a POE search request.

Each communication device 110 is coupled to one or more data capturing devices 115-1 through 115-*n*. Each data capturing device 115 may be integrated within the communication device 110 or disposed separately from the communication device 110 and communicatively coupled to the communication device 110, for example, via a direct-mode air interface link without any intervening infrastructure between them. In one embodiment, the data capturing device(s) 115 and the communication device 110 may form a personal area network, in accordance with one or more direct-mode air-interface protocols, such as Bluetooth, near field communication (NFC), Infrared Data Association (IrDA), ZigBee, direct-mode land-mobile-radio (LMR), and/or Wi-Fi (Wireless Fidelity), as long as the devices 110, 115 are within mutual transmission range of one another.

The data capturing devices 115 include devices that are capable of capturing real time data, for example, data identifying features or characteristics corresponding to one or more POEs that are present in a given area, for example, relative to a location at which the one or more data capturing devices 115 are deployed. The data capturing device 115 includes, but not limited to, an audio sensor (e.g., microphone), a video sensor (e.g., camera), infrared sensor, sonar sensor, sensors such as a chemical, biological, radiological, nuclear, or explosive (CBRNE) sensor, biometric sensor, smell sensor, and motion sensors (such as light sensor, accelerometer, magnetometer, and/or gyroscope). In accordance with some embodiments, each data capturing device 115 may capture different type of data and may further operate with different data capturing settings that are configured based on the type and capability of the data capturing device 115. Each data capturing device 115 may also operate with a particular capturing range, for example, defined by distance, line of sight, and/or a geographic area within which the device is capable of acquiring data related to POEs. The data captured by the data capturing devices 115 relative to a POE may take form of: (a) a visual data (e.g., data indicating a facial feature of a person, a hair color, a skin tone, a tattoo, a birthmark, an eye color, a body shape, a feature of an article worn by the person (color or pattern of jewelry, watch, clothes, backpack, shoe etc, worn by or carried by a person), a feature of an inanimate object such as object type (e.g., vehicle type/make), shape, color, pattern (e.g., muzzle flash pattern from a firearm shot or blast); (b) sound data (data indicating speech direction, ambient noise, voice or vocal characteristics of a person, sound produced by gun shots, collision or drop of objects, etc), or (c) metrics or measurements data indicating quantity or quality of captured data (for example, amount of particular chemical substances, body temperature, speed and direction of movement or other activities of an object or person, heart rate, breathing rate, biometric data etc) depending on the type of the deployed data capturing devices 115.

In accordance with embodiments, the POE search controller 120 detects a POE search request (e.g., BOLO message) originating from one or more POE search request sources 125 (e.g., CAD device), extracts POE of interest metadata from POE search request that includes one or more features (e.g., facial feature and voice sample of a suspect) associated with the POE of interest, generates a POE detection classifier based on the one or more features associated with the POE of interest, identifies one or more types of data capturing devices (e.g., camera and microphone of a public safety personnel) that are capable of capturing data for use in detecting the POE of interest, determines data capturing settings (e.g., resolution, bit rate, mode, or capturing range) for each type of the data capturing device based on the POE of interest metadata and type of the data capturing device, generates a modified POE search request that includes the POE detection classifier and data capturing settings, and transmits the modified POE search request to one or more communication devices 110.

In accordance with some embodiments, the POE search controller 120 may select communication devices 110 to send the modified POE search request based on a geographic region (POE search area 140) in which the POE of interest is to be searched. For example, the communication devices 110-1 through 110-*n* are shown in FIG. 1 as being located in the POE search area 140 and therefore the POE search controller 120 may send the modified POE search request to only communication devices 110-1 through 110-*n* that are located in the POE search area 140. In some cases, the POE search controller 120 may send the modified POE search request to communication devices of public safety personnel who have been assigned a responsibility (e.g., responding to another incident or patrolling an area or specifically to search for the POE of interest) that may include traveling through the POE search area 140. In one embodiment, the POE search controller 120 may dynamically update/expand the POE search area 140 depending on an update that is received corresponding to the POE of interest metadata. For example, the POE search controller 120 may receive information about one or more potential locations of the POE of interest. In this case, the POE search controller 120 may expand the POE search area to cover the directions in which the suspect may be moving and may send the modified POE search request to communication devices 110 in the expanded POE search area.

The communication device 110 activates a POE detection process to detect the POE of interest in response to receiving the modified POE search request from the POE search controller 120. The communication device 110 selects one or more data capturing devices 115 based on the type of devices identified in the data capturing settings and further configures the data capturing settings at the respective data capturing devices 115. The communication device 110 then processes the data captured by the data capturing devices using the POE detection classifier, and generates a notification indicating a detection of the POE of interest when the data processed by the POE detection classifier indicates a positive detection of the POE of interest.

In accordance with some embodiments, the communication devices 110 that are selected by the POE search controller 120 to perform the POE detection process are capable of operating as 'edge' devices for the purposes of detecting the POE of interest. Edge devices are computing devices that are capable of performing POE detection process using POE detection classifiers that are configured/stored on the edge devices. POE detection classifiers are trained (for example, using neural networks) to detect particular POE of interest without further processing requirements at the servers. In other words, employing edge devices to perform POE detection process reduces round-trip data latency and also network traffic associated with periodically sending captured data to a server for performing POE detection process at the server. In some cases, the edge devices may remove the POE detection classifier stored at the devices when the modified search request expires after a predetermined period or when a notification indicating the detection of POE of interest is received (e.g., when the suspect is located).

Figure 2:
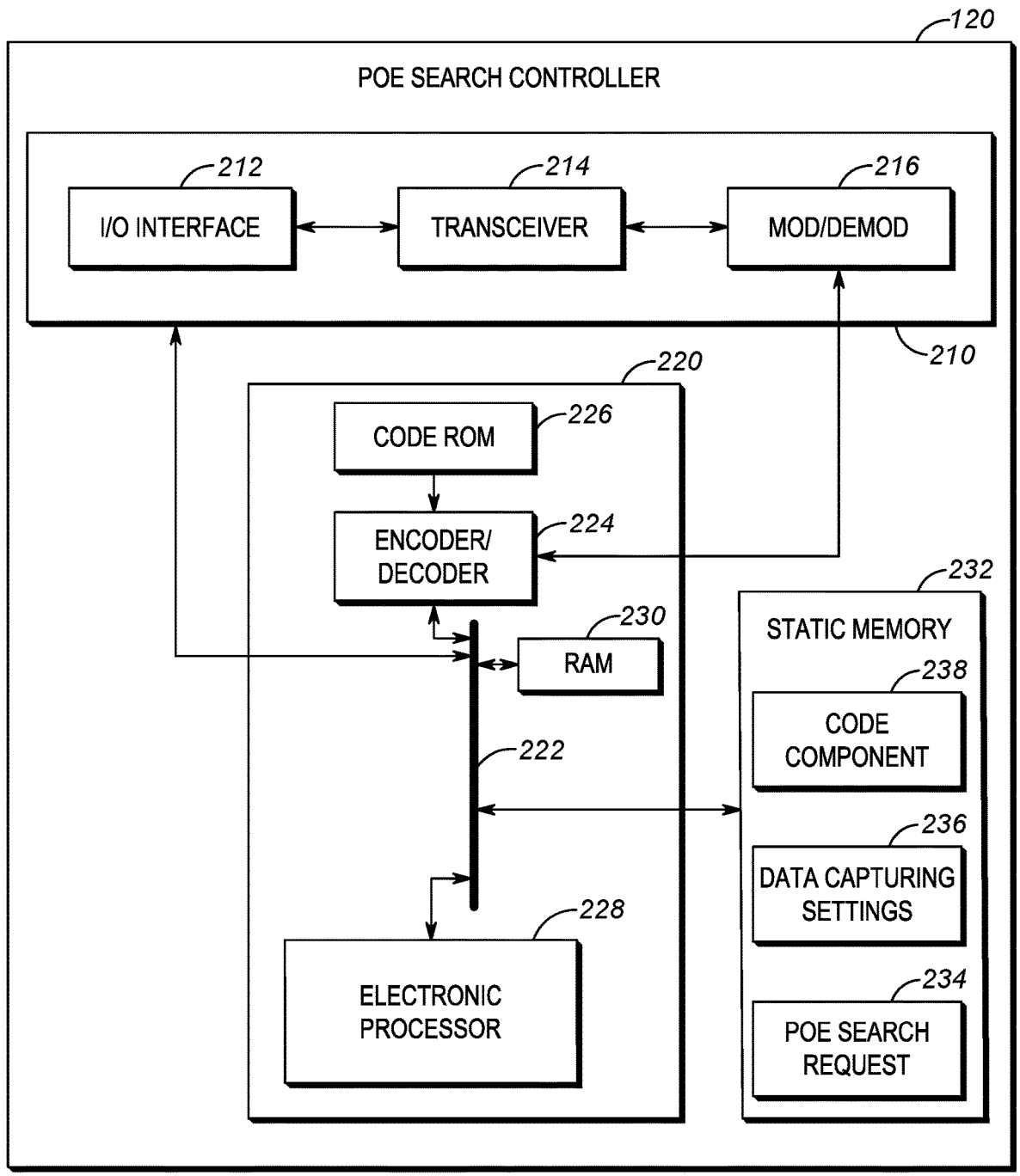
FIG. 2 is a device diagram showing a device structure of a POE search controller of the system of FIG. 1 in accordance with some embodiments.

FIG. 2 is an example functional block diagram of a POE search controller 120 that operates within the communication system to generate and transmit a modified POE search request to one or more communication devices 110 in the system 100, in accordance with some embodiments. While FIG. 2 represents the POE search controller 120 described above with respect to FIG. 1, depending on the type of the device or server, the POE search controller 120 may include fewer or additional components in configurations different from that illustrated in FIG. 2. In one embodiment, the functionalities and components associated with the POE search controller 120 may be implemented in a server computer or backend device such as a CAD device, a command center, call controller, zone controller, or other network components or edge devices that are deployed by public safety agencies to monitor incidents and provide instructions to public safety personnel responding to the incident. In some embodiments, the functionality and components associated with the POE search controller 120 is implemented in a distributed manner in different computing devices across the system 100.

As shown in FIG. 2, the POE search controller 120 includes a communications unit 210 that is coupled to a common data and address bus 222 of a processing unit 220. The communications unit 210 may include one or more wired or wireless input/output (I/O) interfaces 212 that are configurable to communicate with communication devices 110, POE search request sources 125, and/or with other devices in or communicably coupled to the system 100. The communications unit 210 may include one or more wireless transceivers 214, such as a digital mobile radio (DMR) transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX (Worldwide Interoperability for Microwave Access) transceiver perhaps operating in accordance with an IEEE 802.16 standard, an LTE transceiver, mesh network transceiver, and/or other similar type of wireless transceiver configurable to communicate via a wireless radio network. The communications unit 210 may additionally include one or more wireline transceivers 214, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 214 is also coupled to a combined modulator/demodulator 216 that is coupled to an encoder/decoder 224 of the processing unit 220.

The processing unit 220 may include the encoder/decoder 224 with an associated code Read Only Memory (ROM) 226 for storing data for initializing system components, and encoding and/or decoding voice, data, control, or other signals that may be transmitted or received between the POE search controller 120 and communication devices 110 in the system 100. The processing unit 220 may further include a electronic processor 228 coupled, by the common data and address bus 222, to the encoder/decoder 224, a Random Access Memory (RAM) 230, and a static memory 232.

Static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Static memory 232 may store POE search request 234 that is received and/or extracted from one or more POE search request data sources 125. The POE search request 234 includes POE of interest metadata that identifies the POE of interest to be searched, one or more features that uniquely identifies the POE of interest, and other information (e.g., last known location or current location of the POE of interest, one or more incidents with which the POE of interest is associated, etc) that identifies the POE of interest. In accordance with some embodiments, the POE search controller 120 may detect the POE search request 234 from a search request data source 125, for example, based on a communication originating from a CAD device and thereafter obtains further information corresponding to POE of interest metadata from one or more other data sources such as record management system (RMS) that may store further information related to the POE of interest. In accordance with embodiments, the POE search controller 120 generates POE detection classifier for a particular POE of interest based on the POE of interest metadata stored in the memory 232.

The POE detection classifier is a classification detector associated with an analytics engine that evaluates the data captured by the data capturing devices 115, for example, an image or part of an image captured by the camera to determine if an instance of the POE is detected or not. In accordance with some embodiments, the POE search controller 120 may train the POE detection classifier using a training data set that may include, for example, images or other data with predetermined or known instances of the POE of interest (for examples, image data corresponding to a person that is captured at different locations) as well as examples of data showing what the POE is not. A trained POE detection classifier can then be used by computing devices such as communication devices 110 to detect POE of interest from the captured data without requiring further input from the POE search controller 120. For example, the POE detection classifier may be configured to detect only those persons who are wearing a blue shirt with a red hat and further is in possession of a particular type of fire arm. In this case, the POE detection classifier will generate positive indication of detection of POE of interest only when the corresponding data capturing devices 115 (e.g., a camera) reports data identifying a person wearing a blue shirt with a red hat and further is in possession of the particular type of fire arm. Otherwise, the POE detection classifier will continue to process the data captured by the data capturing devices 115 without providing positive indication of detection of POE of interest.

Static memory 232 may also further maintain data capturing settings 236 for different type of data capturing devices 115. For example, the data capturing settings corresponding to a camera, which is a type of data capturing device 115, includes mode selection, image resolution, bit rate, field of view, view angle, depth of field, focus, image acquisition rate, and the like. The data capturing settings corresponding to an audio sensor includes microphone on, directional microphone setup, filtering, and the like. Other data capturing settings, for example, corresponding to other types of sensors include biometric sensor rates, data types, connectivity setup, data acquisition rate, and the like. In one embodiment, the POE search controller 120 may maintain a table of available data capturing settings 236 for different type of data capturing devices 115, and may use this table to determine/select data capturing settings 236 for detection of particular POE of interest. In this case, the POE search controller 120 may further select data capturing settings based on the POE of interest metadata (e.g., a higher resolution may be required to capture a particular feature of the POE of interest) and the type of data capturing devices (e.g., an audio sensor may be required to capture sound generated by the POE of interest) that are capable of capturing data related to the POE of interest.

Static memory 232 may further store operating code 238 for the electronic processor 228 that, when executed, performs one or more of the functions set forth in this description. For example, the electronic processor 228 of the POE search controller 120: detects a POE search request indicating a request to search the POE of interest; extracts, from the POE search request, POE of interest metadata including one or more features associated with the POE of interest; generates a POE detection classifier based on the one or more features associated with the POE of interest; identifying one or more types of data capturing devices that are capable of capturing data for detection of the POE of interest; determines, for each of the one or more types of data capturing devices, respective data capturing settings based on the POE of interest metadata and respective device type associated with the data capturing devices; generates a modified POE search request indicating a request to search POE of interest, the modified POE search request including the POE detection classifier and respective data capturing settings for each of the one or more types of data capturing devices; and transmits the modified POE search request to one or more communication devices 110, for example, communication devices 110-1 through 110-$n$ that are located within a POE search area 140 as shown in FIG. 1.

Figure 3:
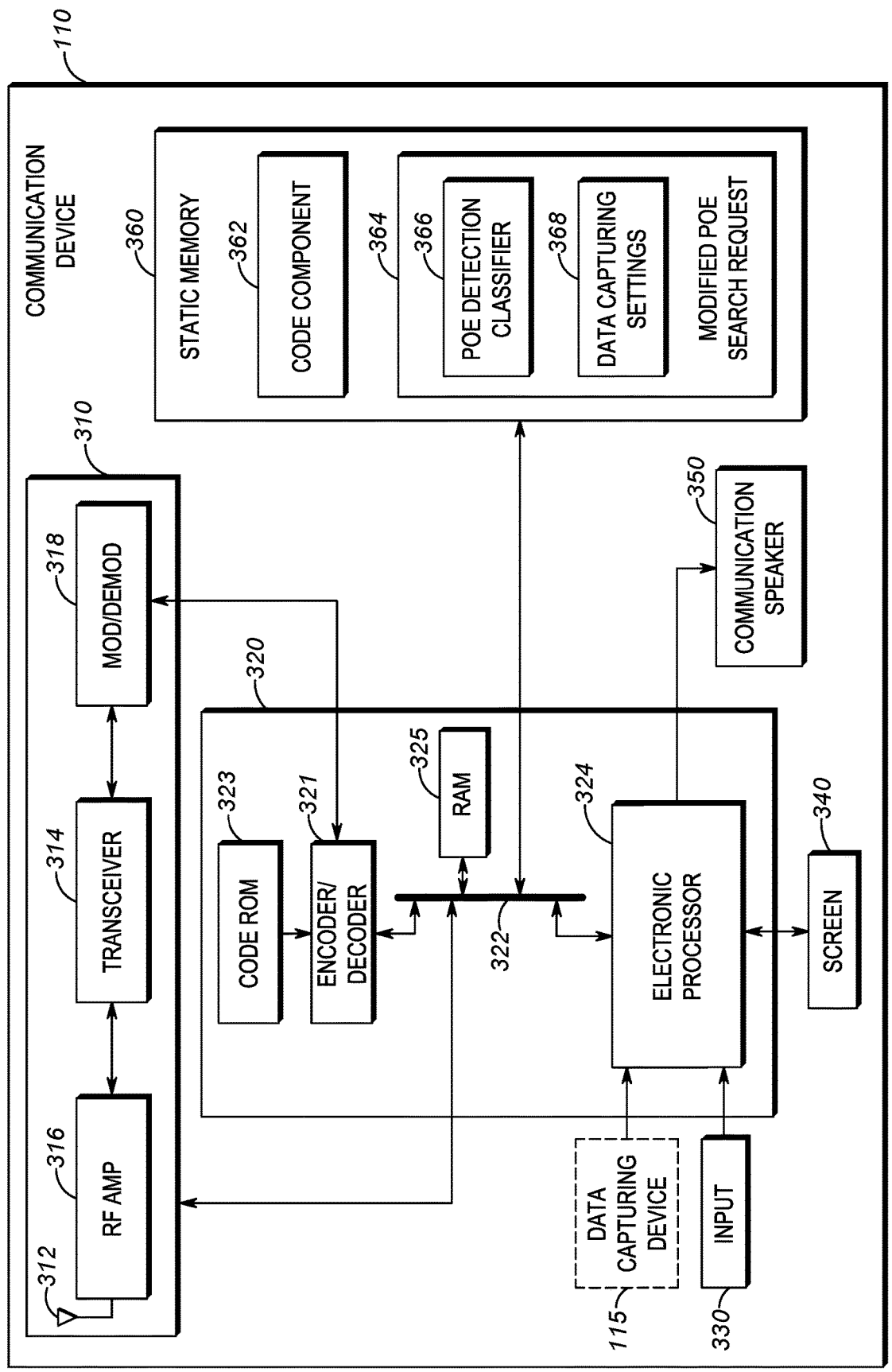
FIG. 3 is a device diagram showing a device structure of a communication device of the system of FIG. 1 in accordance with some embodiments.

FIG. 3 is an example functional block diagram of a communication device 110 operating within the communication system 100 in accordance with some embodiments. As shown in FIG. 3, the communication device 110 comprises a radio frequency communications unit 310 coupled to a common data and address bus 322 of a processing unit 320. The communication device 110 may also include an input 330 and a display screen 340, each coupled to be in communication with processing unit 320. The input 330 may include an alphanumeric physical keypad (or virtual keypad in cooperation with capacitive touch display screen 340) for inputting text for communications. The display screen 340 may further function to display, for example, notifications corresponding to one or more POE search requests received via communications unit 310 from the POE search controller 120. In accordance with some embodiments, one or more data capturing devices 115 may be included in the communication device 110 that may be used by the user of the communication device 110 to perform communications including video and voice communications as well as capture data for purposes of detecting POE of interest. For example, the data capturing device may include a microphone that captures audio from a user that is further vocoded by processing unit 320 and transmitted as voice data by communication unit 310 to other communication devices 110 in the system 100. A communications speaker 350 reproduces audio that is decoded from voice data transmissions received from other communication devices 110 via the communications unit 310.

The processing unit 320 may also include an encoder/decoder 321 with an associated code Read Only Memory (ROM) 323 for storing data for initializing system components and encoding and/or decoding voice or other traffic information (including image data, audio data, video data, text data, control signals including POE search requests, etc.) that may be transmitted or received by the communication device 110. The processing unit 320 may further include a electronic processor 324 coupled, by the common data and address bus 322, to the encoder/decoder 321, a RAM 325, and a static memory 360.

The radio frequency communications unit 310 is a combined receiver and transmitter (e.g., transceiver) having a common antenna 312. The radio frequency communications unit 310 has a transceiver 314 coupled to the antenna 312 via a radio frequency amplifier 316. The transceiver 314 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 314 is also coupled to a combined modulator/demodulator 318 that is coupled to the encoder/decoder 321. The electronic processor 324 has ports for coupling to the input 330 and to the display screen 340. The electronic processor 324 further has ports for coupling to the data capturing device(s) 115 and to the speaker 350.

Static memory 360 may comprise, for example, a HDD, an optical disk drives such as a CD drive or DVD drive, a SSD, a tape drive, a flash memory drive, or a tape drive, to name a few. In accordance with some embodiments, the static memory 360 may store the modified POE search request 364 that is received from the POE search controller 120, via the communications unit 310. The static memory 360 also further stores the POE detection classifier 366 and data capturing settings 368 that are included in the modified POE search request 364. In one embodiment, the communication device 110 may receive and store more than one modified POE search request 364 (and the corresponding POE detection classifier 366 and data capturing settings 368) and may further maintain a POE search request queue to process the received modified POE search requests 364 in a sequence to activate the POE detection process for detecting the corresponding POE of interest. In some embodiments, the communication device 110 may process the received POE search request 364 based on a priority level associated with the POE search request. For example, the communication device 110 may stop the current POE detection process for a previously received POE search request to initiate a new POE detection process for the newly received POE search request if the priority level of the newly received POE search request is higher than the priority level of the previously received POE search request.

In embodiments of the present disclosure, the static memory 360 may store operating code 362 for the electronic processor 324 that, when executed by the electronic processor 324, perform one or more of the operations described in this disclosure. For example, the electronic processor 324 of the communication device 110 activates a POE detection process in response to receiving a modified POE search request 364 from the POE search controller 120. The electronic processor 324 of the communication device 110 further selects one or more data capturing devices 115 that corresponds to the one or more types of data capturing devices 115 for which the data capturing settings are included in the modified POE search request 364. The electronic processor 324 then configures the respective data capturing settings at the respective data capturing devices 115. The electronic processor 324 processes the data captured by the respective data capturing devices with the respective data capturing settings using the POE detection classifier. The electronic processor 324 then generates a notification (for example, for displaying on the display screen 340) indicating a detection of the POE of interest identified in the modified POE search request, when the data processed by the POE detection classifier indicates a positive detection of the POE of interest.

Figure 4:
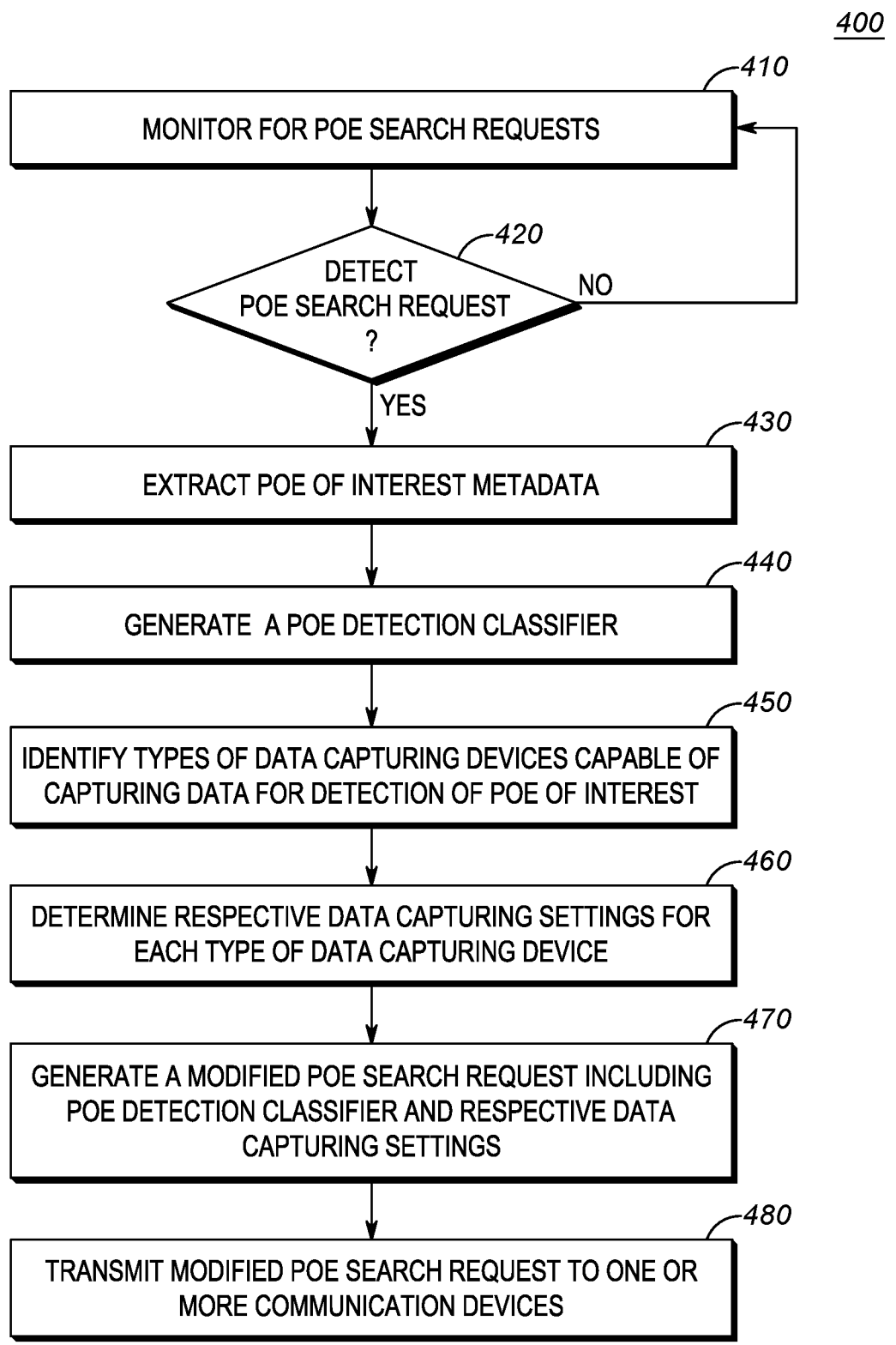
FIG. 4 illustrates a flow chart of a method of modifying a search request corresponding to a POE of interest in accordance with some embodiments.

FIG. 4 illustrates a flow chart diagram of a method 400 performed by the POE search controller 120 for modifying a POE search request corresponding to a POE of interest. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The method shown in FIG. 4 can be performed by one or more components, for example, electronic processor 228 of the POE search controller 120, and will be described with reference to the functions and components of the system 100.

At block 410, the POE search controller 120 monitors for POE search requests. The POE search controller 120 may monitor communications originating from and/or stored on different POE search request sources 125. In one embodiment, the POE search controller 120 may be configured to receive automated notifications when one or more of the POE search request sources 125 stores and/or transmits a POE search request notification (e.g., a BOLO or APB message) to devices associated with the public safety personnel. In other embodiments, the POE search controller 120 monitors communications and stored data originating from pre-determined POE search request sources 125, for example, using a natural language processing (NLP) engine that may be implemented at the POE search controller 120 or other network components at the system 100.

At block 420, the POE search controller 120 detects whether the monitored communications and/or stored data corresponds to a POE search request. In an embodiment where the POE search controller 120 receives automated notifications, the POE search controller 120 automatically detects the POE search request based on the received notifications. In other embodiments, the POE search controller 120 identifies and detects a POE search request using the NLP engine. The NLP engine parses voice, text, or video data associated with electronic communications originating from and/or stored data on pre-determined POE search request sources 125, extracts one or more patterns (e.g., keywords) from the parsed data, and processes the patterns to identify if the patterns corresponds to one or more predetermined patterns that are related to a POE search request, for example, a BOLO message. For example, the POE search controller 120 may monitor calls associated with emergency call centers and dispatch systems, and automatically detect, based on the analysis of the calls, that a POE search request is initiated corresponding to a POE of interest. If the POE search controller 120 does not detect any POE search request at a given time, the POE search controller 120 continues to monitor for POE search requests from the pre-determined POE search request sources 125 as shown in block 410. Otherwise, the POE search controller 120 proceeds to block 430 when it detects a POE search request.

At block 430, the POE search controller 120 extracts POE of interest metadata from the detected POE search request. In some embodiments, the POE search controller 120 may extract POE of interest metadata from additional data sources such as record management system that may contain additional information such as historical incidents that are related to the POE of interest. The POE of interest metadata includes a feature or combination of features that may be used to distinguish a POE of interest. For example, the POE of interest metadata corresponding to a person may include information related to one or more of: sex, age, race, name, anatomical features such as facial features, biometric information such as fingerprints, color of shirt, pant, or other apparel, information related to objects carried or worn by the person, address, information related to the incident associated with the person such as last known location, date of incident or date since the person is missing, and the like.

At block 440, the POE search controller 120 generates a POE detection classifier based on the POE of interest metadata. In accordance with some embodiments, the POE search controller 120 generates the POE detection classifier using one or more features of the POE of interest. The POE detection classifier is a classification detector associated with an analytics engine. The POE detection classifier is generated and trained using a training data set that may include, for example, images or other data with predetermined or known instances of the POE of interest (for examples, image data corresponding to a person that is captured at different locations) as well as examples of data showing what the POE is not. In accordance with embodiments of the disclosure, a POE detection classifier that is generated using features of a particular POE of interest, functions to detect only this particular POE of interest for which it is generated. For example, a POE detection classifier may be trained to look for a male face wearing a blue shirt.

At block 450, the POE search controller 120 identifies one or more types of data capturing devices 115 that are capable of capturing data for detection of the POE of interest. In one embodiment, the POE search controller 120 analyzes the features included in the POE of interest metadata to identify the type of data that needs to be captured in order for the POE detection classifier to detect the POE of interest. The POE search controller 120 then identifies the type of data capturing device 115 based on the type of data supported by the data capturing device 115. For example, if the POE of interest metadata includes features (e.g., facial feature and voice sample of a person) that are related to both visual and sound data, then the POE search controller 120 may determine that a video sensor such as a camera and a sound sensor such as a microphone are data capturing devices 115 that are capable of capturing visual and sound data, respectively. In some cases, the POE search controller 120 may select only one type of data capturing device, for example, a video sensor, if the features included in the POE of interest metadata correspond to only visual data. In some embodiments, the POE search controller 120 may also maintain an inventory of types of data capturing devices 115 that are available for capturing data at a given location. In these embodiments, the POE search controller 120 identifies the type of data capturing devices 115 based on the availability of the devices as well as the capability of the devices to capture data corresponding to features included in the POE of interest metadata.

At block 460, the POE search controller 120 determines data capturing settings for each type of data capturing device that is identified at block 450. The POE search controller 120 determines the data capturing settings for each type of data capturing device based on the POE of interest metadata and the type of the data capturing device. In accordance with some embodiments, the POE search controller 120 may access the table of data capturing settings 236 that is stored in the static memory 232 to select the data capturing settings that is capable for capturing particular features included in the POE of interest metadata. In accordance with some embodiments, the POE search controller 120 may also determine the data capturing settings further based on the location and/or time of day (or ambient light) at which the data capturing device is deployed or to be deployed for the purposes of capturing data for detecting the POE of interest. For example, if the POE of interest metadata indicates that the POE of interest is to be searched in a poorly lit location such as a park, then the POE search controller 120 may select the data capturing settings for a video sensor that includes configuring the video sensor to operate, for example, in night vision mode (or heat sensing mode) to search for POEs in the poorly lit location. Similarly, the data capturing settings may include changing the camera mode to operate with selective filters to find a person with a particular skin color or tone. The data capturing settings may also include configuring the direction of the microphone to capture sound data originating from a particular direction or inserting of a particular noise filter to listen for a male or female voice.

At block 470, the POE search controller 120 generates a modified POE search request indicating a request to search the POE of interest. The modified POE search request includes POE detection classifier (generated at block 440) and data capturing settings that are determined at block 460 for each type of data capturing device identified at block 450.

At block 480, the POE search controller 120 transmits the modified POE search request to one or more communication devices 110 via its communications unit 210. The modified POE search request may be sent to communication devices 110 in the form of BOLO or APB notifications. In accordance with some embodiments, the modified POE search request may include a special indicator in the message that indicates that the message is a modified POE search request to differentiate it from the conventional POE search request, which does not include the data capturing settings and POE detection classifier. This special indicator may indicate to the communication device 110 to autonomously activate the POE detection process at the communication device 110 using the POE detection classifier and data capturing settings included in the modified POE search request. In one embodiment, the POE search controller 120 selects the one or more communication devices 110 for transmitting the modified POE search request based on a location associated with the POE of interest. The POE search controller 120 selects communication devices 110 based on whether the communication devices 110 are deployed or to be deployed in a POE search area 140 that is defined by the location associated with the POE of interest. In other embodiments, the POE search controller 120 selects a communication device 110 based on whether the communication device is coupled to the type of data capturing devices that are identified at block 450 as capable of capturing data for detecting the POE of interest. In yet other embodiments, the POE search controller 120 also further selects a communication device 110, for example, based on user profile (e.g., rank, role, incident assignment/location, agency, talk group etc.) associated with the user of the communication device 110.

In one embodiment, the POE search controller 120 transmits the modified POE search request with a priority level that is assigned to the modified POE search request. The priority level indicates a priority with which the POE detection process is to be initiated at the communication device 110 responsive to receiving the modified POE search request. The POE search controller 120 may automatically determine priority level for a modified POE search request based on one or more factors selected from the group consisting of: type of POE of interest (e.g., searching for a person of interest in a given area may be more crucial than searching for an inanimate object), incident type and severity associated with the POE of interest (e.g., searching for a suspect may be more crucial than a missing jewelry), incident date, location, etc. In accordance with some embodiments, the selection of communication devices 110 to transmit the modified POE search request is also further dependent on whether the communication device 110 and the associated data capturing devices 115 are currently processing a POE search request. In this case, the POE search controller 120 may send the modified POE search request to another communication device 110 in the POE search area 140. In some embodiments, the POE search controller 120 may transmit multiple POE search requests with respective priority levels to the same communication device. In these embodiments, the communication device 110 receiving multiple POE search requests processes the POE search requests according to their priority levels.

Figure 5:
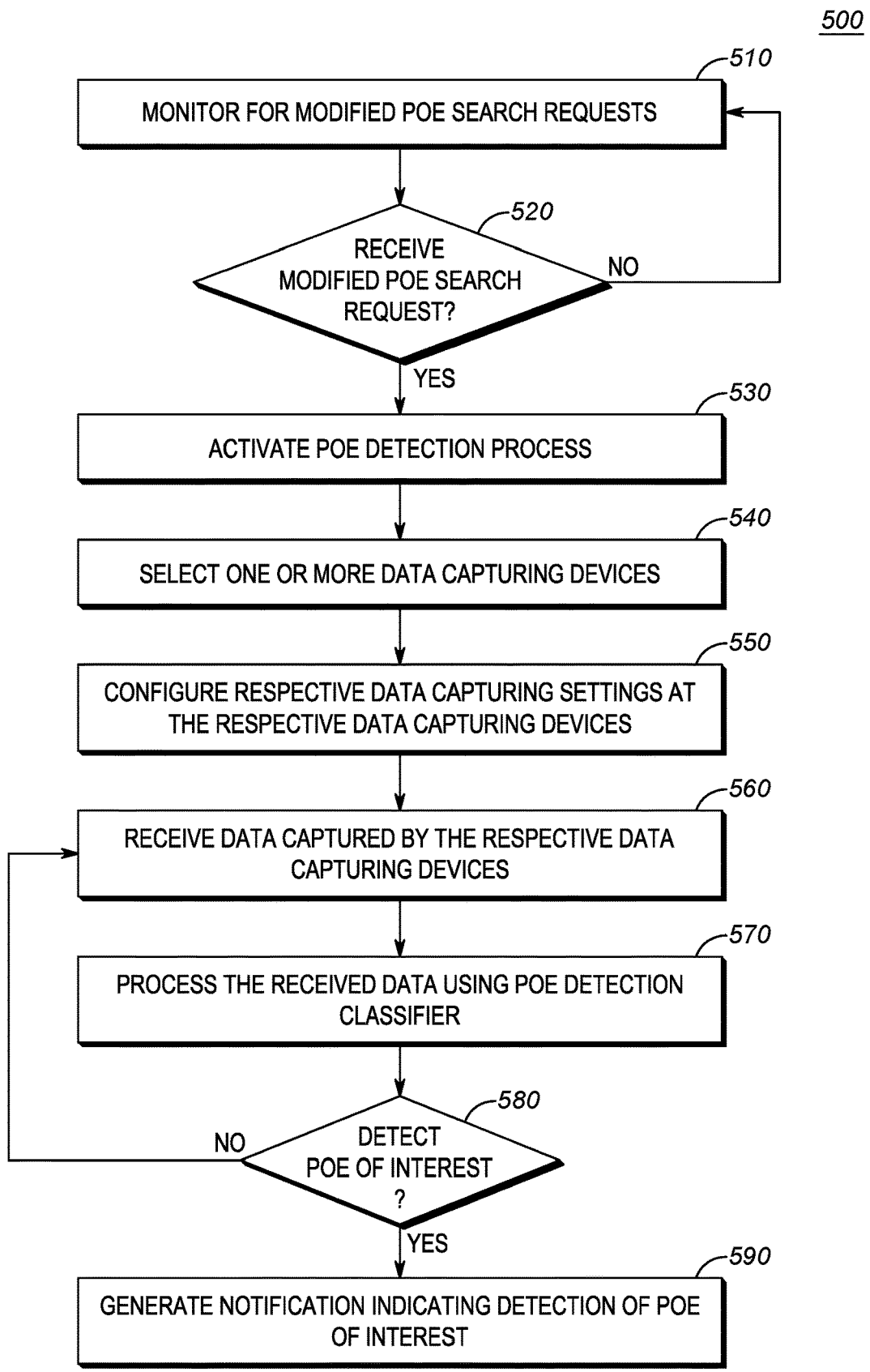
FIG. 5 illustrates a flow chart of a method of performing a POE detection process responsive to receiving a modified POE search request in accordance with some embodiments.

FIG. 5 illustrates a flow chart diagram of a method 500 performed by the communication device 110 to perform a POE detection process responsive to receiving a modified POE search request. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. The method shown in FIG. 5 can be performed by one or more components, for example, electronic processor 324 of the communication device 110, and will be described with reference to the functions and components of the system 100.

At block 510, the communication device 110 monitors for modified POE search requests. For example, the communication device 110 may receive the modified POE search request in the form of an APB or BOLO notification from the POE search controller 120 via the communication network 130. APB or BOLO notifications representing a modified POE search request may include a special message indicator that indicates that the notification is a modified POE search request to differentiate it from conventional APB or BOLO notifications. If the communication device 110 receives a conventional APB or BOLO notification, the communication device 110 may display the notification for normal processing by the user.

At block 520, the communication device 110 detects whether it has received the modified POE search request. The communication device 110 processes the incoming notifications to determine if the incoming notification corresponds to a modified POE search request. In one embodiment, the communication device 110 may parse the received message using an NLP engine to detect whether the received message corresponds to a modified POE search request. In one embodiment, the communication device 110 may identify that the received message corresponds to a modified POE search request by detecting the special indicator in the message. If the communication device 110 does not detect any modified POE search request, it continues to monitor for modified POE search requests as shown in block 510. Otherwise, if the communication device 110 receives and detects a modified POE search request, the communication device 110 proceeds to block 530 and activates a POE detection process for detecting the POE of interest identified in the modified POE search request.

In accordance with some embodiments, the communication device 110 may be configured to activate the POE detection process automatically when it detects the modified POE search request. In some cases, the communication devices 110 are capable of activating POE detection process corresponding to more than one modified POE search request. In other cases, the communication devices 110 processes the received modified POE search request based on the priority level assigned to the search request. For example, if the communication device 110 receives a new POE search request with a higher priority level and is already performing a POE detection process for a previously received POE search request with a lower priority level than the new POE search request, then the communication device 110 may de-activate the POE detection process for the previously received POE search request in order to activate the POE detection process for the new POE search request. Otherwise, if the priority level of the new POE search request is same or lower than the priority level of the previously received POE search request, then the communication device 110 may add the new POE search request to the POE search request queue for processing.

At block 540, the communication device 110 selects one or more data capturing devices 115 based on the modified POE search request. The communication device 110 selects data capturing devices 115 corresponding to the type of data capturing devices 115 for which the data capturing settings are included in the modified POE search request. The selected data capturing devices 115 may be either included within the communication device 110 or alternatively communicatively coupled to the communication device 110 via a personal area network. In one embodiment, responsive to receiving the modified POE search, the communication device 110 may temporarily form a personal area network with one or more data capturing devices that are deployed and available in the POE search area 140 in order to perform the POE detection process.

At block 550, the communication device 110 configures the respective data capturing settings at the selected data capturing devices 115 that are connected to the communication device 110. For example, a PAN controller (e.g., implemented at electronic processor 228) within the personal area network may be used by the communication device 110 to manage the configuration of the data capturing settings at the selected data capturing devices 115 in the PAN. For example, the PAN controller may send signals to the data capturing device 115 along with instructions related to configuring the data capturing settings at the data capturing settings. The instructions may identify the respective data capturing settings (e.g., set video mode to 1080 p, 30 fps, and maximum bit rate) and the type of data capturing device (e.g., camera). Responsive to the instructions received from the PAN controller, the data capturing device 115, for example, the camera may process the instructions to set the video mode to 1080 p, 30 fps, and maximum bit rate while capturing images corresponding to POEs that are within the field of view of the camera.

At block 560, the communication device 110 receives the data captured by one or more of the data capturing devices 115, for example, via the PAN. The captured data may take form of the visual data, sound data, metrics or measurements data, or other forms of data depending on the type of the data capturing device 115.

At block 570, the communication device 110 processes the data captured by respective data capturing devices 115 using the POE detection classifier. In accordance with some embodiments, the communication device 110 may activate one or more POE detection applications or micro services that may be configured to execute the POE detection classifier to process the data received from the data capturing devices 115. For example, the POE detection classifier may represent a single object classifier that may be trained to analyze an image data received from the data capturing device 115 to locate a POE of interest among multiple POEs of the same type, based on a particular description or feature, for example, a color. For example, the classifier may be trained to locate multiple faces in an image and apply post-filtering on the faces to look for a person of interest (e.g., a person wearing a blue color shirt).

At block 580, the communication device 110 determines whether the results of data processed by the POE detection classifier indicates a successful detection of the POE of interest indicated in the modified POE search request. If the results do not indicate successful detection of POE of interest, the communication device 110 continues to receive and process data captured by the data capturing devices 115 corresponding to a particular modified POE search request as shown in block 560, until the POE detection process results in a successful detection of POE of interest at the device or the POE detection process for the current POE search request is de-activated (for later processing), for example, when a new POE search request is received with a higher priority level. In another embodiment, the modified POE search request may expire when a time period assigned to the request expires or when the POE of interest is successfully detected at other edge devices deployed at the POE search area 140 or when the communication device 110 receives an indication from the POE search controller 120 or other network devices that the POE request is no longer valid based on an update (e.g., POE is no longer POE of interest) received corresponding to an incident associated with the POE of interest.

At block 590, when the communication device 110 determines that the results of data processed by the POE detection classifier indicates a successful detection of the POE of interest, the communication device 110 generates a notification indicating the detection of the POE of interest. In accordance with some embodiments, the communication device 110 displays the notification of the successful detection of the POE of interest, via the display screen 340 of the communication device 110. In some embodiments, the communication device 110 may provide indication of the successful detection of the POE of interest, via the communication speaker 350 or other output components (e.g., via light emitting diodes (LEDs) implemented at the communication device 110. In alternative embodiments, the communication device 110 may transmit the notification indicating the successful detection of POE of interest to alert other devices, such as the POE search controller 120, other communication devices 110, and CAD device. The notification may include information related to the location (e.g., POE search area) of the communication device 110 and data captured and/or processed by the data capturing devices 115 corresponding to the detected POE of interest.

In accordance with some embodiments, the communication device 110, in response to completing the POE detection process for the current POE search request, may proceed to repeat the method 500 for activating the POE detection process for the next POE search request in the queue, for example, based on the sequence in which the POE search request is received or based on the priority level assigned to the POE search requests in the queue.

Figure 6:
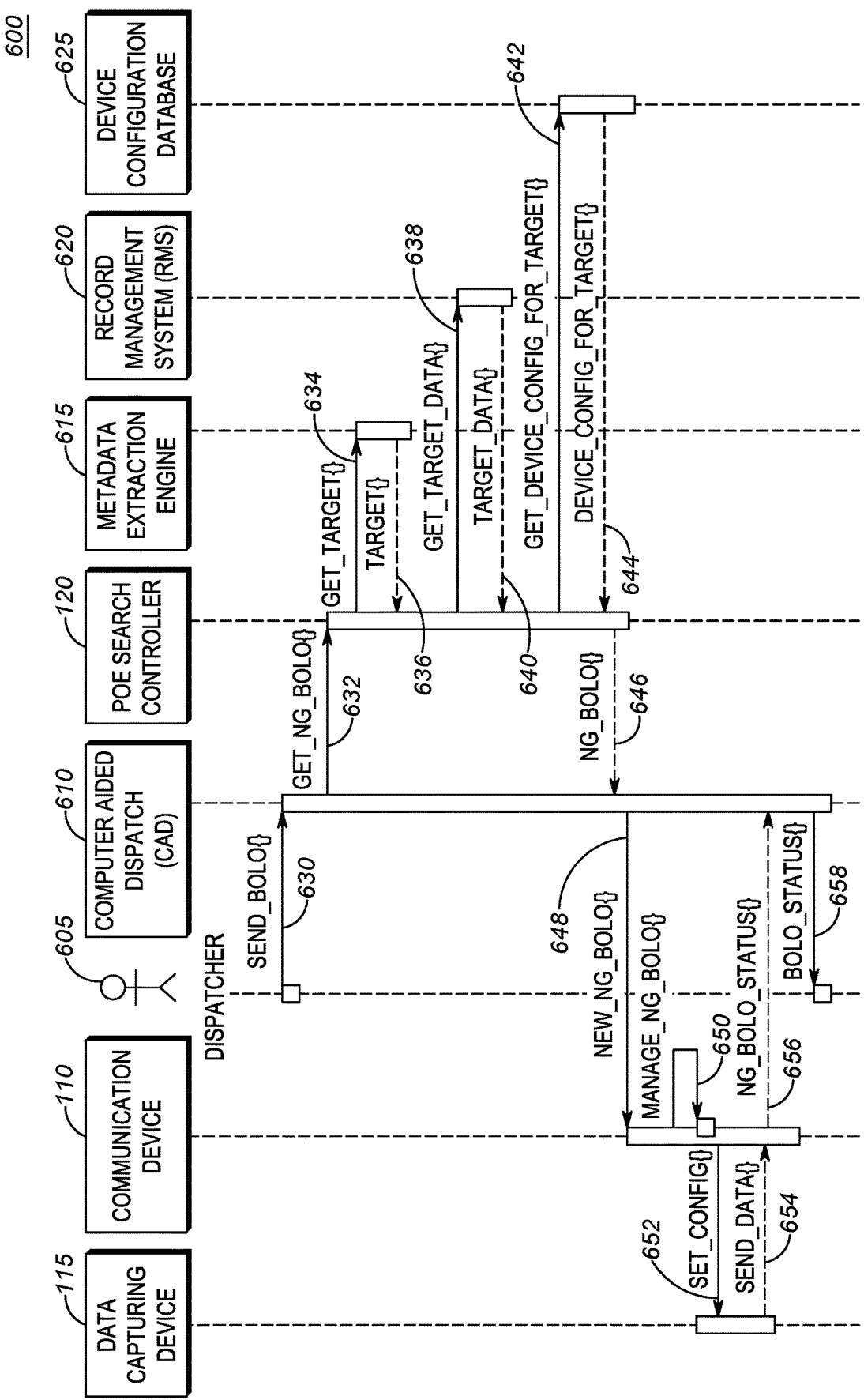
FIG. 6 is an example message flow diagram implementing the method of modifying POE search request corresponding to a POE of interest in accordance with some embodiments.

FIG. 6 is an example message flow diagram implementing the method of modifying POE search request corresponding to a POE of interest. In FIG. 6, a public safety communication system 600 is shown to illustrate how a BOLO message provided by a dispatcher 605 via a computer aided dispatch (CAD) device 610 is processed in accordance with some embodiments. The system 600 including a communication device 110, a POE search controller 120, and a data capturing device 115, is similar to the system 100 shown in FIG. 1. As shown in FIG. 6, the dispatcher 605 provides input corresponding to a BOLO message (send_bolo{ }) 630 to a CAD device 610. The BOLO message 630 identifies the POE of interest (e.g., a suspect). The CAD device 610, in response to receiving the BOLO message 630, sends a request (get_ng_bolo{ }) 632 to POE search controller 120 to generate a next generation ('ng') BOLO message. The next generation BOLO message is similar to the modified POE search request described in accordance with embodiments of the disclosure. The POE search controller 120 sends a request (get_target) 634 to a metadata extraction engine 615 to extract metadata related to a target, i.e., the POE of interest identified in the BOLO message 630. The metadata extraction engine 615 may include a text or voice analysis module (e.g., NLP engine) that is capable of parsing real-time communications and data received from different data sources to extract metadata corresponding to a particular POE of interest. The metadata extraction engine 615 may be implemented at the POE search controller 120 or at one or more other devices in the system 600 or 100. The metadata extraction engine 615 then sends the extracted metadata (target{ }) 636 corresponding to the POE of interest to the POE search controller 120.

The POE search controller 120 may further send a request (get_target_data{ }) 638 to one or more public safety databases such as a record management system (RMS) 620 to extract more information related to the POE of interest. The RMS 620 is a database associated with the public safety communication system 600 that stores incident information, that may include historical or current information related to the POE of interest. In response to the request, the RMS 620 sends additional information (target_data{ }) 640 related to the POE of interest to the POE search controller 120. For example, the additional information may include one or more facial features and color of the shirt worn by the suspect during an incident.

In accordance with embodiments, the POE search controller 120 uses the metadata and additional information that is received from the RMS 620 to extract data configurations settings (also referred to as data capturing settings). In the example shown in FIG. 6, the POE search controller 120 sends a request (get_device_config_for_target{ }) 642 to a device configuration database 625 to access device configuration settings required for capturing the features associated with the POE of interest. In FIG. 6, the device configuration database 625 is shown as an external device. In other embodiments, the device configuration database 625 may be stored at the POE search controller 120 and may include information that is similar to the information stored in data capturing settings 236 at the static memory 232 of the POE search controller 120. The device configuration database 625 sends device configuration settings (device_config_for_target{ }) 644 to the POE search controller 120. The POE search controller 120 generates a next generation BOLO message (ng_bolo{ }) 646 based on the device configuration settings. In accordance with some embodiments, the next generation BOLO message 646 also includes POE detection classifier that allows edge devices (data capturing devices 115 and/or communication devices 110), to process captured data and perform classification and detection of POE of interest at the edge device, without further requirement of the processing at the server.

As shown in FIG. 6, the POE search controller 120 sends the ng_bolo{ } message 646 to the CAD device 610. The CAD device 610 in turn sends the new_ng_bolo{ } message 648 to the communication device 110, for example, a selected communication device 110 that is deployed or to be deployed in an area to search the POE of interest. The communication device 110 receives the new_ng_bolo{ } message 648 and manages the message (manage_ng_bolo{ }) 650 based on a priority level assigned to the received message 648. For example, the communication device 110 activates the POE detection process if the communication device 110 is not currently processing a message with a higher priority level than the received message 648. The communication device 110 configures the device configuration settings at the data capturing device 115 by pushing the configuration settings (set_config{ }) 652 at the data capturing device 115. The data capturing device 115 captures data and sends the captured data (send_data{ }) 654 to the communication device 110. In accordance with embodiments, the data capturing devices 115 are configured to perform the POE detection process corresponding to the POE of interest, without further sending it to the communication device 110 for processing. In these embodiments, the data capturing devices 115 may be provided with the POE detection classifier to process the captured data and detect whether the captured data corresponds to the POE of interest.

The communication device 110 processes the captured data 654 using the POE detection classifier to detect the POE of interest and may send the status (ng_bolo_status{ }) 656 of the new BOLO message to the CAD device 610. In accordance with some embodiments, the ng_bolo_status{ } message 656 may include a notification indicating whether the POE of interest has been detected at the communication device 110. The CAD device 610 in turn may provide the bolo_status message 658 indicating the status of the new BOLO message 648 to the dispatcher 605.

In accordance with embodiments of the disclosure, system and methods described herein can be advantageously employed in public safety environments to improve the person, object, or entity (POE) search process. The embodiments described herein automatically monitor and modify POE search requests such as BOLO messages to include device configuration settings and classifiers that enable edge devices to autonomously activate POE detection process responsive to receiving the BOLO messages. This autonomous activation of POE detection process reduces workload associated with manually reviewing and performing the configurations required for capturing data and detecting the POE of interest. Modifying BOLO messages further allows edge devices to perform POE detection process while reducing network traffic associated with transmitting captured data back and forth for processing at the servers.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operating a search controller to modify a search request corresponding to a person, object, or entity (POE) of interest, the method comprising:
   detecting a POE search request indicating a request to search a presence of the POE of interest in a geographic area;
   extracting, from the POE search request, POE of interest metadata including one or more unique image or sound features associated with the POE of interest;
   generating a POE detection classifier based on the one or more unique image or sound features associated with the POE of interest;
   identifying one or more types of data capturing devices located in the geographic area, the one or more types of data capturing devices capable of capturing real-time data identifying the one or more unique image or sound features associated with the POE of interest when the POE of interest is present within the geographic area;
   determining, for each of the one or more types of data capturing devices, respective image or sound data capturing settings based on the POE of interest metadata and respective device type associated with data capturing devices;
   generating a modified POE search request indicating a request to search the POE of interest, the modified POE search request including the POE detection classifier and respective image or sound data capturing settings for each of the one or more types of data capturing devices; and
   transmitting the modified POE search request to one or more communication devices coupled to the one or more types of data capturing devices.

2. The method of claim 1, wherein detecting comprises:
monitoring communications between a dispatch device and one or communication devices assigned to an incident; and
extracting one or more keywords in the communications that correspond to the POE search request.

3. The method of claim 1, wherein detecting comprises at least one of:
monitoring one of communications and stored data originating from a plurality of pre-determined POE search request sources; and
extracting one or more keywords in the communications or stored data that correspond to the POE search request.

4. The method of claim 1, further comprising:
configuring the one or more communication devices to activate a POE detection process responsive to receiving the modified POE search request at the one or more communication devices.

5. The method of claim 4, wherein the POE detection process comprises:
selecting one or more data capturing devices that correspond to the one or more of the one or more types of data capturing devices and further communicatively coupled to the one or more communication devices;
configuring the respective image or sound data capturing settings at the respective data capturing devices;
processing, using the POE detection classifier, image or sound data captured by the respective data capturing devices with the respective image or sound data capturing settings; and
generating a notification indicating a detection of the POE of interest when the image or sound data processed by the POE detection classifier indicates a positive detection of the presence of the POE of interest in the geographic area.

6. The method of claim 4, wherein the one or more communication devices include edge devices and wherein the data capturing devices includes devices that are coupled to the edge devices via a personal area network.

7. The method of claim 4, further comprising:
transmitting the modified POE search request with a first priority level assigned to the modified POE search request, the first priority level indicating a priority with which the POE detection process is to be initiated at the communication devices responsive to receiving the modified POE search request.

8. The method of claim 7, further comprising:
generating a second modified POE search request corresponding to a search request corresponding to a second POE of interest; and
transmitting the second modified POE search request to the one or more communication devices with a second priority level assigned to the second modified POE search request.

9. The method of claim 8, wherein the second priority level is higher than the first priority level, the method further comprising:
configuring the one or more communication devices to de-activate the POE detection process corresponding to the POE of interest at the one or more communication devices and activate a POE detection process corresponding to the second POE of interest at the one or more communication devices responsive to receiving the second modified POE search request with the second priority level at the one or more communication devices.

10. The method of claim 1, wherein the POE of interest metadata further includes a location associated with the POE of interest, the method further comprising:
determining that the one or more communication devices are deployed in the geographic area defined by the location associated with the POE of interest; and
selecting the one or more communication devices for transmitting the modified POE search request in response to the determination.

11. A method for operating a search controller to modify a search request corresponding to a person, object, or entity (POE) of interest, the method comprising:
detecting a POE search request indicating a request to search the POE of interest;
extracting, from the POE search request, POE of interest metadata including one or more features associated with the POE of interest;
generating a POE detection classifier based on the one or more features associated with the POE of interest;
identifying one or more types of data capturing devices that are capable of capturing data for detection of the POE of interest;
determining, for each of the one or more types of data capturing devices, respective data capturing settings based on the POE of interest metadata and respective device type associated with data capturing devices;
generating a modified POE search request indicating a request to search the POE of interest, the modified POE search request including the POE detection classifier and respective data capturing settings for each of the one or more types of data capturing devices; and
transmitting the modified POE search request to one or more communication devices,
wherein the POE search request includes a message selecting from the group consisting of: be on the lookout (BOLO) message, all point bulletins (APB), and missing person alert message.

12. A controller, comprising:
a transceiver; and
an electronic processor communicatively coupled to the transceiver, wherein the electronic processor is configured to
detect a person, object, or entity (POE) search request indicating a request to search a presence of a POE of interest in a geographic area,
extract, from the POE search request, POE of interest metadata including one or more unique image or sound features associated with the POE of interest,
generate a POE detection classifier based on the one or more unique image or sound features associated with the POE of interest,
identify one or more types of data capturing devices located in the geographic area, the one or more types of data capturing devices capable of capturing real-time data identifying the one or more unique image or sound features associated with the POE of interest when the POE of interest is present within the geographic area,
determine, for each of the one or more types of data capturing devices, respective image or sound data capturing settings based on the POE of interest metadata and respective device type associated with data capturing devices,
generate a modified POE search request indicating a request to search the POE of interest, the modified POE search request including the POE detection classifier and respective image or sound data capturing settings for each of the one or more types of data capturing devices, and transmit, via the transceiver, the modified POE search request to one or more communication devices coupled to the one or more types of data capturing devices.

13. The controller of claim 12, wherein the electronic processor is configured to:

monitor, via the transceiver, one of communications and stored data originating from a plurality of pre-determined POE search request sources; and extract one or more keywords in the communications or stored data that correspond to the POE search request.

14. The controller of claim 13, wherein the electronic processor is configured to:

activate a POE detection process at the one or more communication devices responsive to receiving the modified POE search request at the one or more communication devices.

15. The controller of claim 14, wherein the electronic processor is configured to:

transmit, via the transceiver, the modified POE search request with a first priority level assigned to the modified POE search request, the first priority level indicating a priority with which the POE detection process is to be initiated at the communication devices responsive to receiving the modified POE search request.

16. The controller of claim 12, wherein the electronic processor is configured to:

determine that the one or more communication devices are deployed in the geographic area defined by a location associated with the POE of interest; and select the one or more communication devices to transmit the modified POE search request.

17. The controller of claim 12, wherein the POE search request includes a message selecting from the group consisting of: be on the lookout (BOLO) message, all point bulletins (APB), and missing person alert message.

18. The method of claim 1, wherein the one or more types of data capturing devices include a camera or a microphone.

19. The method of claim 1, wherein the unique image or sound features associated with the POE of interest include a facial feature or a voice sample of the POE of interest.

20. The controller of claim 12, wherein the one or more types of data capturing devices include a camera or a microphone.

* * * * *